US012613357B2

(12) United States Patent
Round et al.

(10) Patent No.: US 12,613,357 B2
(45) Date of Patent: Apr. 28, 2026

(54) PROCESSING SUBSURFACE DATA WITH UNCERTAINTY FOR MODELLING AND FIELD PLANNING

(71) Applicant: Schlumberger Technology Corporation, Sugar Land, TX (US)

(72) Inventors: Andrew Round, Abingdon (GB); Liviu Adrian Anton, Abingdon (GB); Pierre Amoudruz, Abingdon (GB); Kwangwon Park, Houston, TX (US); Sergey Anisimov, Radal (NO); Adam Younger, Oxford (GB); Mark Wakefield, Abingdon (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 481 days.

(21) Appl. No.: 18/256,824

(22) PCT Filed: Dec. 10, 2021

(86) PCT No.: PCT/US2021/062737
§ 371 (c)(1),
(2) Date: Jun. 9, 2023

(87) PCT Pub. No.: WO2022/125852
PCT Pub. Date: Jun. 16, 2022

(65) Prior Publication Data
US 2024/0019603 A1     Jan. 18, 2024

Related U.S. Application Data

(60) Provisional application No. 63/199,161, filed on Dec. 10, 2020.

(51) Int. Cl.
*G01V 20/00* (2024.01)
*E21B 41/00* (2006.01)

(52) U.S. Cl.
CPC .............. *G01V 20/00* (2024.01); *E21B 41/00* (2013.01); *E21B 2200/20* (2020.05)

(58) Field of Classification Search
CPC ..... G01V 20/00; E21B 41/00; E21B 2200/20; E21B 47/13; E21B 43/00; G06N 20/00; G06G 7/48
See application file for complete search history.

(56) References Cited

U.S. PATENT DOCUMENTS 8,849,639 B2     9/2014   Brown
9,228,415 B2     1/2016   Ingham
(Continued)

FOREIGN PATENT DOCUMENTS

WO     2015138131 A1     9/2015
WO     2024064001 A1     3/2024

OTHER PUBLICATIONS

Al Lawati et al., Agile Field Development Study Leveraging Fast-Tracked Reservoir Modeling and Data Analytics While Incorporating Reservoir Uncertainties, Oct. 31, 2022, ADIPEC Abu Dhabi, Society of Petroleum Engineers SPE-211209-MS, ISBN: 978-1-61399-872-4, pp. 1-12 (Year: 2022).*

(Continued)

*Primary Examiner* — Mi'schita' Henson
(74) *Attorney, Agent, or Firm* — Kyle R. Miiller

(57) ABSTRACT

A method for field development includes receiving input data representing a subterranean volume, generating a multi-domain model of the subterranean volume, statistically sampling one or more of the realizations of the multi-domain model based at least in part on an uncertainty associated therewith, simulating the sampled one or more of the realizations using a field development planning engine, and generating a field development plan based at least in part on the simulated one or more of the realizations.

16 Claims, 14 Drawing Sheets

(56) References Cited

U.S. PATENT DOCUMENTS

| | | |
|---|---|---|
| 10,767,448 B2 | 9/2020 | Djikpesse |
| 2019/0271211 A1* | 9/2019 | Mustapha ............... G06F 17/11 |
| 2022/0372846 A1 | 11/2022 | Lang |

OTHER PUBLICATIONS

Elharith, M. et al., "Integrated Modeling of a Complex Oil Rim Development Scenario Under Subsurface Uncertainty", In Journal of Petroleum Exploration and Production Technology, vol. 9, Dec. 2019, pp. 2417-2428.

Scheidt, C., et al., "Uncertainty Quantification Using Distances and Kernel Methods —Application to a Deepwater Turbidite Reservoir", In Stanford Center for Reservoir Forecasting, 2022, 29 Pages.

Bolt, H., "Quantifying the Uncertainty of the Depth Where Imaging is", EAGE Workshop on Quantifying Uncertainty in Depth Imaging, 2021, Kuala Lumpur, Malaysia, 3 pages.

Yusof, A. I. et al., "Quantifying Depth Uncertainty in Regional Scale—a Probablistic Approach", EAGE Workshop on Quantifying Uncertainty in Depth Imaging, 2021, Kuala Lumpur, Malaysia, 3 pages.

Basir, F. et al., "Re-Imaging through Multi-Level, Highly Saturated Gas Bodies in a Carbonate Regine—a Case Study", EAGE Workshop on Quantifying Uncertainty in Depth Imaging, 2021, Kuala Lumpur, Malaysia, 5 pages.

Sulaiman, M. S. B. et al., "Minimizing depth error through robust velocity model building—a Case Study", EAGE Workshop on Quantifying Uncertainty in Depth Imaging, 2021, Kuala Lumpur, Malaysia, 3 pages.

Sandjivy, L., "Quantifying Uncertainty in Depth Imaging: Case Histories", EAGE Workshop on Quantifying Uncertainty in Depth Imaging, 2021, Kuala Lumpur, Malaysia, 2 pages.

Pua, M. H. et al., "Quantify velocity model Uncertainty and its relationship with Geobodies", EAGE Workshop on Quantifying Uncertainty in Depth Imaging, 2021, Kuala Lumpur, Malaysia, 2 pages.

Johari, A. S. B. et al., "Quantifying Depth Uncertainties below Complex Overburden of Low Velocity Channels", EAGE Workshop on Quantifying Uncertainty in Depth Imaging, 2021, Kuala Lumpur, Malaysia, 2 pages.

Muhamad, A. et al., "Quantifying Depth Imaging Uncertainty of a FWI, Q-KDM and Q-RTM Seismic Volume", EAGE Workshop on Quantifying Uncertainty in Depth Imaging, 2021, Kuala Lumpur, Malaysia, 3 pages.

Tarang, A. et al., "Structural Depth Uncertainties in Producing Oil Fields", EAGE Workshop on Quantifying Uncertainty in Depth Imaging, 2021, Kuala Lumpur, Malaysia, 2 pages.

Hawari, S. A. A. et al., "Depth Prognosis in a Brown Field: When 6m certainty is inadequate", EAGE Workshop on Quantifying Uncertainty in Depth Imaging, 2021, Kuala Lumpur, Malaysia, 2 pages.

Alai, R. et al., "Inherited Uncertainties of Advanced Depth Migrated Images", EAGE Workshop on Quantifying Uncertainty in Depth Imaging, 2021, Kuala Lumpur, Malaysia, 2 pages.

Bloor, R. et al., "A Decade of Seismic Uncertainty and the Opportunities of the Next Decade", EAGE Workshop on Quantifying Uncertainty in Depth Imaging, 2021, Kuala Lumpur, Malaysia, 2 pages.

Zhai, Y. et al., "Efficiently measuring the uncertainty of FWI models and integrateion with tomography and geology", EAGE Workshop on Quantifying Uncertainty in Depth Imaging, 2021, Kuala Lumpur, Malaysia, 2 pages.

Hu, W. et al., "A Robust Self-Supervised Learning System for Low Frequency Seismic Data Extrapolation to Reduce Model Building Uncertainty", EAGE Workshop on Quantifying Uncertainty in Depth Imaging, 2021, Kuala Lumpur, Malaysia, 2 pages.

Chautru, J. et al., "Analyzing and Quantifying Uncertainty in Time-Depth Conversion", EAGE Workshop on Quantifying Uncertainty in Depth Imaging, 2021, Kuala Lumpur, Malaysia, 2 pages.

Balakrishnan, G., "Quantifying Depth Uncertainty in Exploration to Development Cycle through Evolving Imaging Technology", EAGE Workshop on Quantifying Uncertainty in Depth Imaging, 2021, Kuala Lumpur, Malaysia, 2 pages.

Ham, W. Y. et al., "Multi-azimuth Q Inverted Full Waveform Inversion: a Data-Driven Approach for Quantifying Structural Uncertainties Beneath Gas Cloud", EAGE Workshop on Quantifying Uncertainty in Depth Imaging, 2021, Kuala Lumpur, Malaysia, 3 pages.

Li, J. et al., "A 3D pseudo-spectral method for qP-wave simulation in TTI media and its application in RTM", Eage Workshop on Quantifying Uncertainty in Depth Imaging, 2021, Kuala Lumpur, Malaysia, 3 pages.

Hussenoeder, S. et al., "Imaging Depth Uncertainty from an Interpreters Perspective: Implications from Processing to Assessment", EAGE Workshop on Quantifying Uncertainty in Depth Imaging, 2021, Kuala Lumpur, Malaysia, 2 pages.

International Search Report and Written Opinion of International Patent Application No. PCT/US2021/062737 dated on Mar. 8, 2022; 9 Pages.

Extended European Search Report of European Patent Application No. 21904444.3 dated on Oct. 7, 2024; 10 Pages.

Baker, M., "Agile Iterative Reservoir Modelling", In SIS Forum, Oct. 7, 2019, 20 Pages.

* cited by examiner

400

402 — Input: Data representing a subterranean volume

404 — Generate a multi-domain model of the subterranean domain.

406 — Sample realizations of the multi-domain model.

408 — Simulate the realizations using a field development engine.

410 — Generate a field development plan based on the simulations.

500

800

Store one or more shared files in a central database including file relationship data and locations of bulk files. —— 802

Extract one or more simulation models from the one or more shared files. —— 804

Provide metadata associated with the one or more simulation models to one or more client devices. —— 806

1000

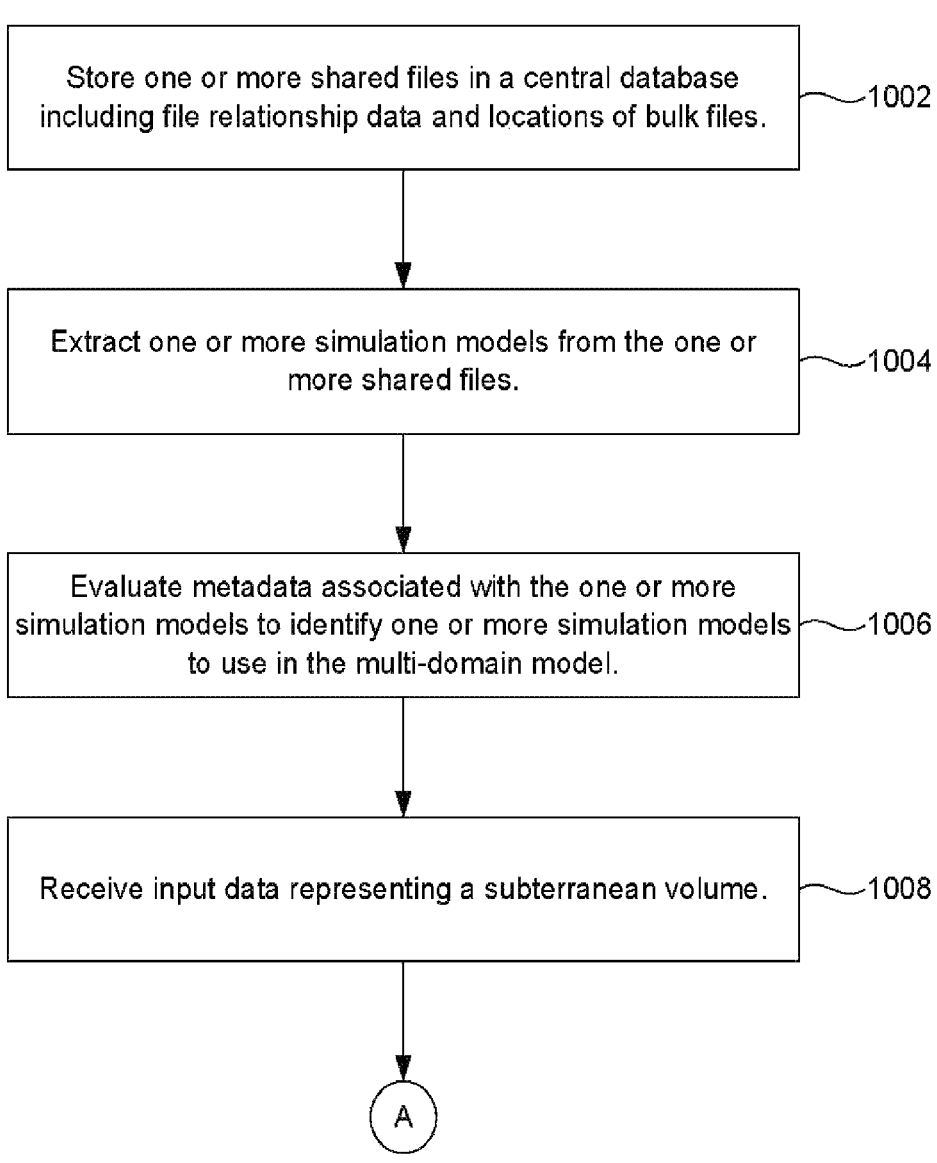

Store one or more shared files in a central database including file relationship data and locations of bulk files. —1002

Extract one or more simulation models from the one or more shared files. —1004

Evaluate metadata associated with the one or more simulation models to identify one or more simulation models to use in the multi-domain model. —1006

Receive input data representing a subterranean volume. —1008

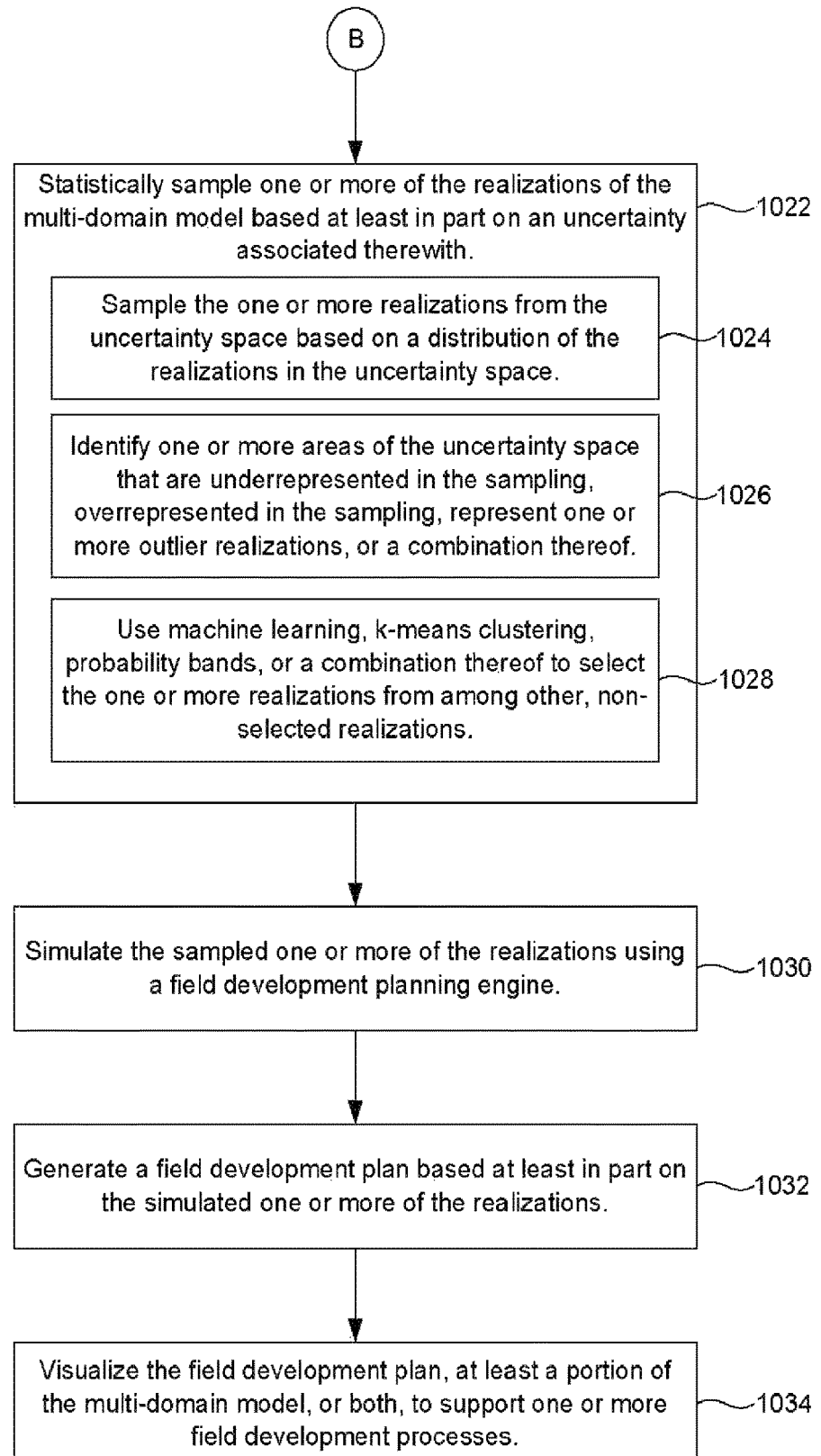

B

Statistically sample one or more of the realizations of the multi-domain model based at least in part on an uncertainty associated therewith. — 1022

Sample the one or more realizations from the uncertainty space based on a distribution of the realizations in the uncertainty space. — 1024

Identify one or more areas of the uncertainty space that are underrepresented in the sampling, overrepresented in the sampling, represent one or more outlier realizations, or a combination thereof. — 1026

Use machine learning, k-means clustering, probability bands, or a combination thereof to select the one or more realizations from among other, non-selected realizations. — 1028

Simulate the sampled one or more of the realizations using a field development planning engine. — 1030

Generate a field development plan based at least in part on the simulated one or more of the realizations. — 1032

Visualize the field development plan, at least a portion of the multi-domain model, or both, to support one or more field development processes. — 1034

FIG. 10C

PROCESSING SUBSURFACE DATA WITH UNCERTAINTY FOR MODELLING AND FIELD PLANNING

CROSS-REFERENCE TO RELATED APPLICATIONS

This application is a National Stage entry of International Patent Application No. PCT/US2021/062737, filed on Dec. 10, 2021, which claims priority to U.S. Provisional Patent Application Ser. No. 63/199,161, filed on Dec. 10, 2020, the entirety of which is incorporated herein by reference.

BACKGROUND

Modelling processes are frequently used for business or project planning, e.g., at various stages in oilfield exploration and production, to name one specific example. These modelling processes are based on data that may have an amount of uncertainty associated therewith. Moreover, the models may be used to model or "simulate" uncertain processes, e.g., within a probabilistic framework. Further, a project or business opportunity can have many connected elements, each individually complex and uncertain and where effective planning accounts for such uncertainty in the modelling at the individual stages.

Existing technology often involves the selection of one or a small number of "representative" realizations from the uncertain modelling processes. These realizations are intended to capture a range of uncertainty, e.g., P10, P50, P90. However, this sort of selection can introduce bias and other unintended side-effects. Moreover, the selection of these representative realizations can be a difficult, slow, and manual/non-repeatable process. Other solutions may use an inferred sampling of supposed realizations drawn by examining the statistical envelope of the model output; however, such approaches cannot easily maintain the self-consistency of the information in each such supposed realization, which reduces the value of the downstream assessments.

Accordingly, it may be desirable to propagate uncertainty through the various modelling and processing phases consistently, and without, for example, attempting to make "representative" determinations in one modelling domain to benefit an entirely separate modelling domain. Thus, there is a need for methods and computing systems that can employ more effective and accurate methods for identifying, isolating, transforming, and/or processing various aspects of seismic signals and other subsurface data, uncertainty, and other data that is collected from a subsurface region or other multi-dimensional space, and then using that data as processed to aid in project planning workflows.

SUMMARY

Embodiments of the disclosure include a method including receiving input data representing a subterranean volume, generating a multi-domain model of the subterranean volume, statistically sampling one or more of the realizations of the multi-domain model based at least in part on an uncertainty associated therewith, simulating the sampled one or more of the realizations using a field development planning engine, and generating a field development plan based at least in part on the simulated one or more of the realizations.

In an embodiment, generating the multi-domain model includes generating an ensemble of a plurality of realizations of a first model based at least in part on the input data, an uncertainty of the input data, and an uncertainty of the first model, generating a plurality of second realizations of a second model based at least in part on the ensemble of the plurality of first realizations and an uncertainty of the second model, and including the plurality of second realizations in the ensemble in connection with the realizations of the first model.

In an embodiment, generating the ensemble of the plurality of first realizations includes simulating a process using the first model.

In an embodiment, generating the multi-domain model includes generating an uncertainty space in which the ensemble is represented. The realizations of the multi-domain model are distributed in the uncertainty space. Further, statistically sampling the one or more of the realizations includes statistically sampling the one or more realizations from the uncertainty space based on a distribution of the realizations in the uncertainty space.

In an embodiment, statistically sampling from the uncertainty space includes identifying one or more areas of the uncertainty space that are underrepresented in the sampling, overrepresented in the sampling, represent one or more outlier realizations, or a combination thereof.

In an embodiment, the first model includes the model of at least one physical characteristic of the subterranean volume, and the second model includes a commercial model, an economic model, or a combination thereof.

In an embodiment, statistically sampling includes using machine learning, k-means clustering, probability bands, or a combination thereof to select the one or more realizations from among other, non-selected realizations.

In an embodiment, the method includes visualizing the field development plan, at least a portion of the multi-domain model, or both, to support one or more field development processes.

In an embodiment, the method includes, before generating the multi-domain model, storing one or more shared files in a central database including file relationship data and locations of bulk files, extracting one or more simulation models from the one or more shared files, and evaluating metadata associated with the one or more simulation models to identify one or more simulation models to use in the multi-domain model.

In specific embodiments, a computer program is provided that comprises instructions for implementing the method of any one of the described embodiments in the foregoing Summary paragraphs [0005]-[0013] (these paragraph reference numbers are those in the originally filed Patent Cooperation Treaty application that claims priority to U.S. Provisional Patent Application Ser. No. 63/199,161).

Embodiments of the disclosure include a non-transitory, computer-readable medium storing instructions that, when executed by at least one processor of a computing system, cause the computing system to perform operations. The operations include receiving input data representing a subterranean volume, generating a multi-domain model of the subterranean volume, statistically sampling one or more of the realizations of the multi-domain model based at least in part on an uncertainty associated therewith, simulating the sampled one or more of the realizations using a field development planning engine, and generating a field development plan based at least in part on the simulated one or more of the realizations.

Embodiments of the disclosure include a computing system including one or more processors, and a memory system including one or more non-transitory computer-readable media storing instructions that, when executed by at least one of the one or more processors, cause the computing system to perform operations. The operations include receiving input data representing a subterranean volume, generating a multi-domain model of the subterranean volume. Generating the multi-domain model includes generating an ensemble of a plurality of realizations of a first model based at least in part on the input data, an uncertainty of the input data, and an uncertainty of the first model, generating a plurality of second realizations of a second model based at least in part on the ensemble of the plurality of first realizations and an uncertainty of the second model, and including the plurality of second realizations in the ensemble in connection with the realizations of the first model. The first model includes a model of at least one physical characteristic of the subterranean volume, and the second model includes a commercial model, an economic model, or a combination thereof. The operations also include statistically sampling one or more of the realizations of the multi-domain model based at least in part on an uncertainty associated therewith, simulating the sampled one or more of the realizations using a field development planning engine, and generating a field development plan based at least in part on the simulated one or more of the realizations.

Embodiments of the disclosure include a computing system configured to receive input data representing a subterranean volume, generate a multi-domain model of the subterranean volume, statistically sample one or more of the realizations of the multi-domain model based at least in part on an uncertainty associated therewith, simulate the sampled one or more of the realizations using a field development planning engine, and generate a field development plan based at least in part on the simulated one or more of the realizations.

Embodiments of the disclosure include a computing system including means for receiving input data representing a subterranean volume, means for generating a multi-domain model of the subterranean volume, means for statistically sampling one or more of the realizations of the multi-domain model based at least in part on an uncertainty associated therewith, means for simulating the sampled one or more of the realizations using a field development planning engine, and means for generating a field development plan based at least in part on the simulated one or more of the realizations.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 10A, 10B, and 10C illustrate a flowchart of a method, according to an embodiment.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Figures 1A, 1B:
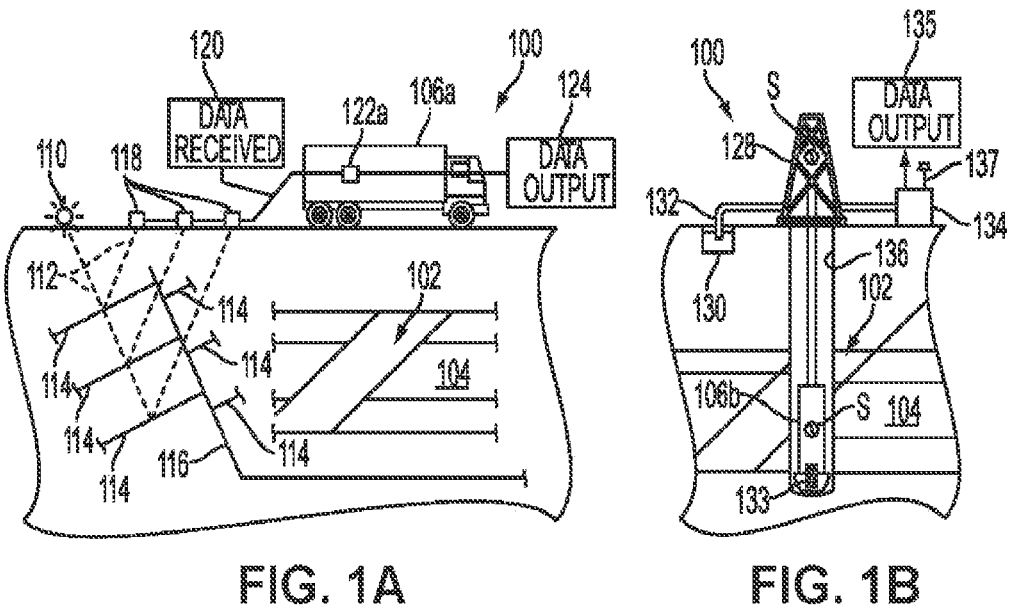
FIGS. 1A, 1B, 1C, 1D, 2, 3A, and 3B illustrate simplified, schematic views of an oilfield and its operation, according to an embodiment.

FIGS. 1A-1D illustrate simplified, schematic views of oilfield 100 having subterranean formations 102 containing reservoir 104 therein in accordance with implementations of various technologies and techniques described herein. FIG. 1A illustrates a survey operation being performed by a survey tool, such as a seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophones 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors(S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real-time data, or combinations thereof. The real-time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

Figures 1C, 1D:
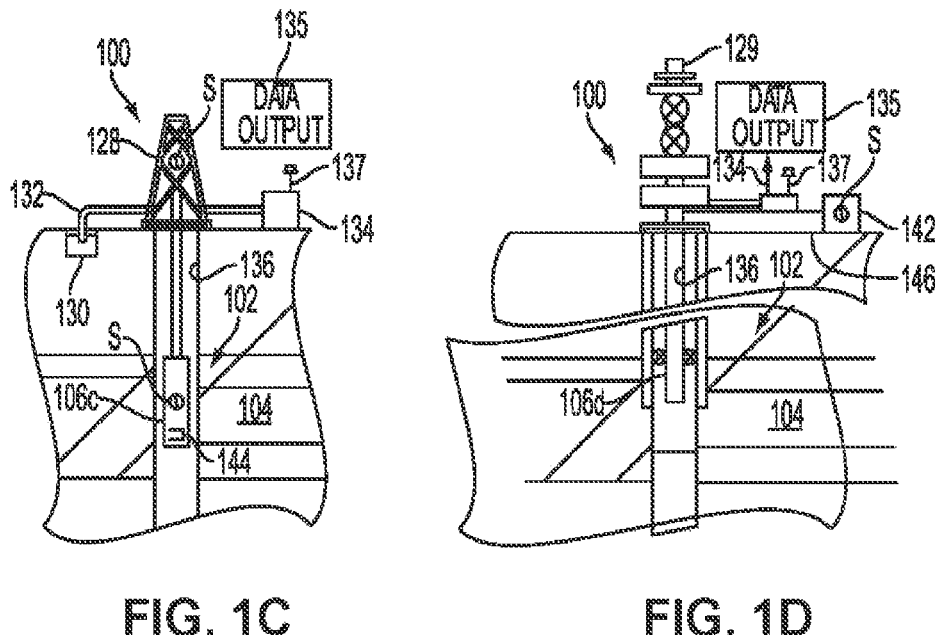

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formations 102.

Sensors(S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors(S), such as gauges, may be positioned about oilfield 100 to collect data relating to various field operations as described previously. As shown, the sensor(S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

Figure 2:
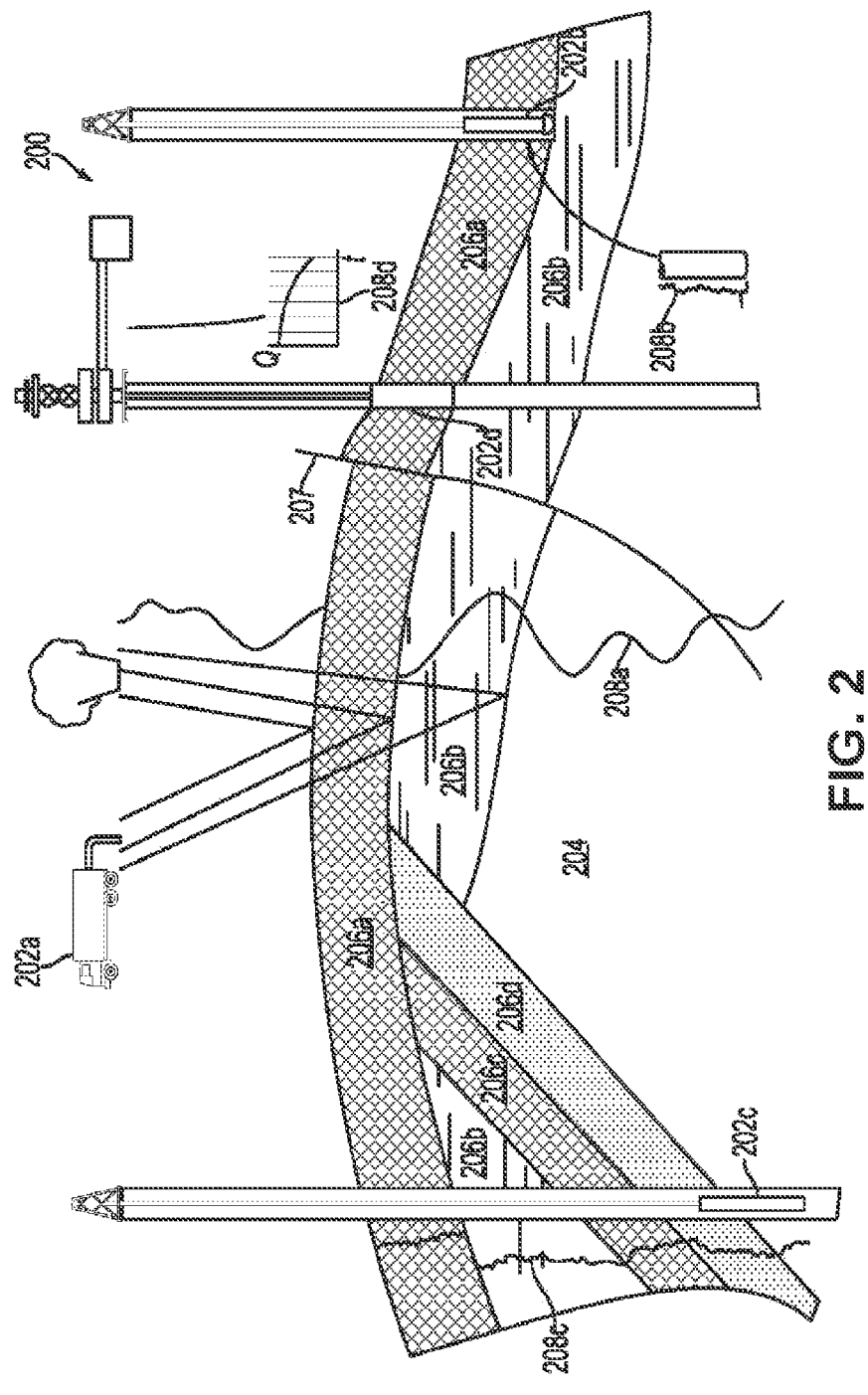

FIG. 2 illustrates a schematic view, partially in cross-section of oilfield 200 having data acquisition tools 202a, 202b, 202c, and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean formation 204 has a plurality of geological formations 206a-206d. As shown, this structure has several formations or layers, including a shale layer 206a, a carbonate layer 206b, a shale layer 206c, and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modelling techniques.

Figure 3A:
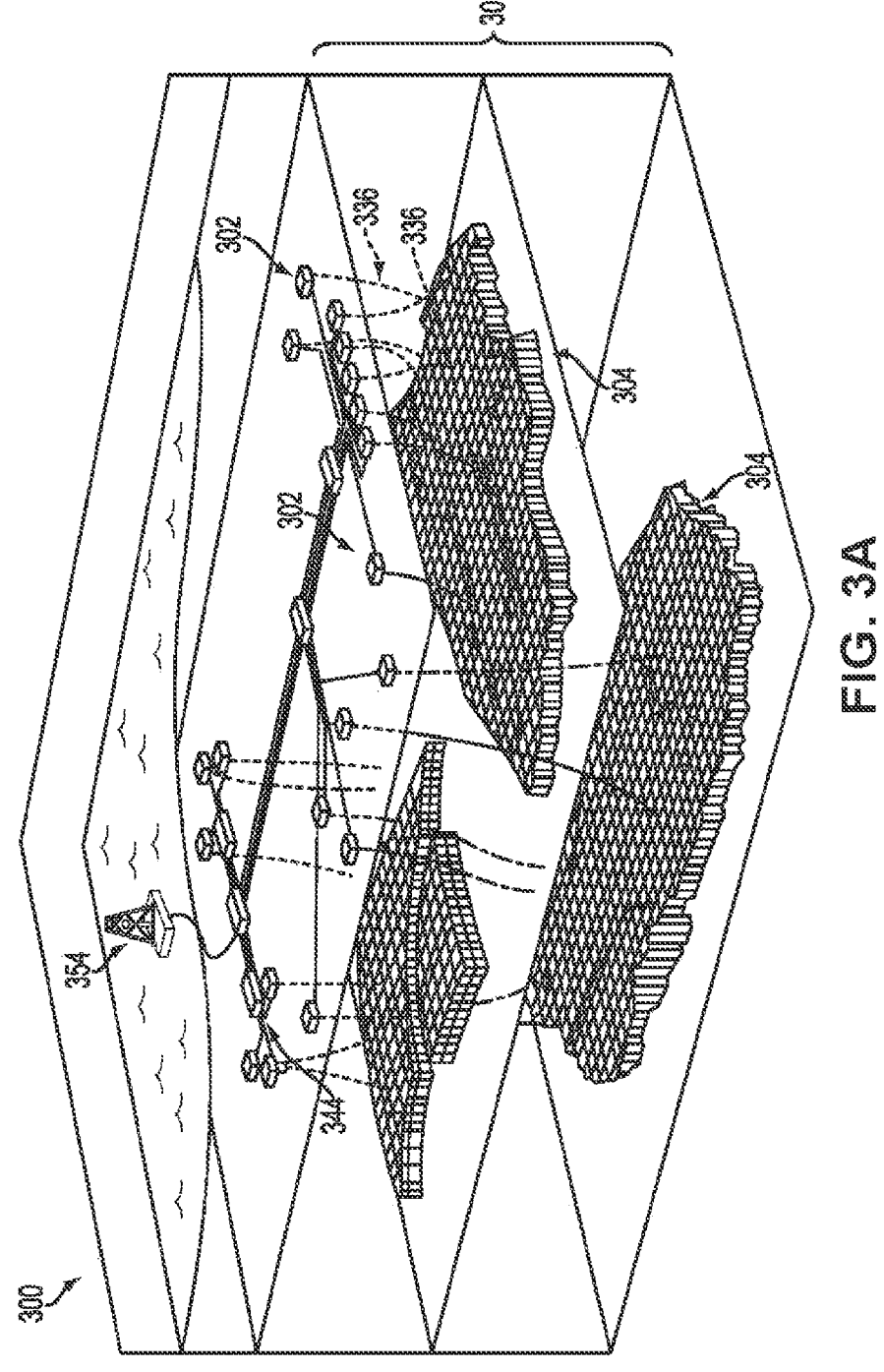

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
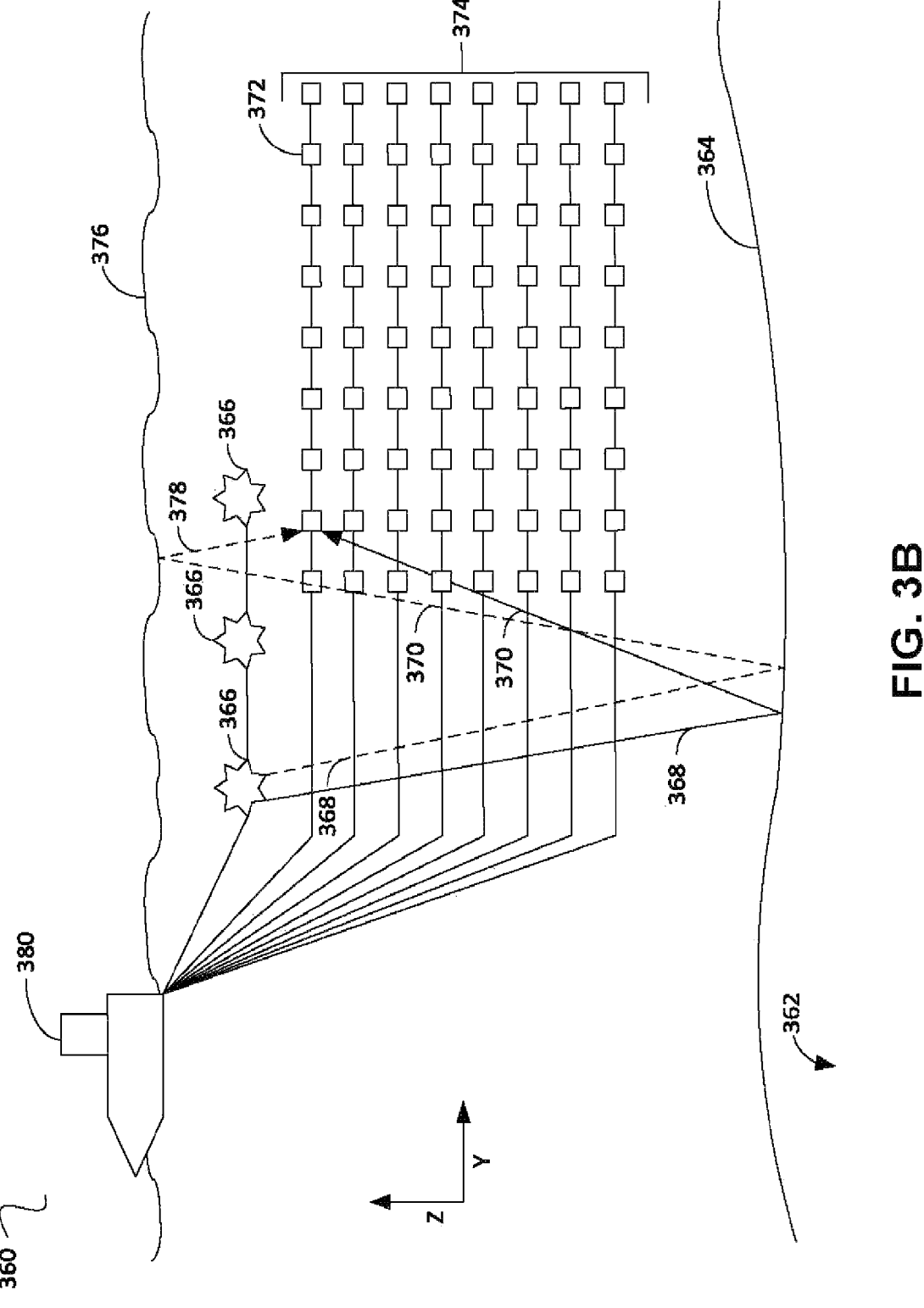

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine-based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Embodiments of the present disclosure may include a system that connects multiple elements of a complex process for business or project planning or evaluation. Each of the elements may be complex in themselves and may be used to capture inherent uncertainty belonging to an individual model or process, permitting this uncertainty to propagate through subsequent models that may be built based at least in part on the models.

The systems can make use of scalable processing (e.g., in the cloud) to explore an uncertainty space representing one or more of the elements. For any given element, a particular assessment is collected as a single ensemble identity. The ensemble entity could capture the uncertain space as multiple realizations or in some other internal form. The downstream elements of the complex process then draw self-coherent realizations from the ensemble identity, drawing whatever number of inputs (from its point of view) are called for.

This arrangement preserves the real content from the up-stream element perspective and simplifies the communication between experts in each upstream downstream pair.

Some embodiments may permit the automation of a full uncertain model connection between the connected elements of the full project plan. Each element may be a complex specialism that may employ training and experience to understand and manipulate. By forming the connection between these with a full uncertain model as a single entity, the details are preserved between the connected elements without the cognitive overload coming from understanding the possible effects of the upstream selecting representative realizations for downstream or vice versa.

Figure 4:
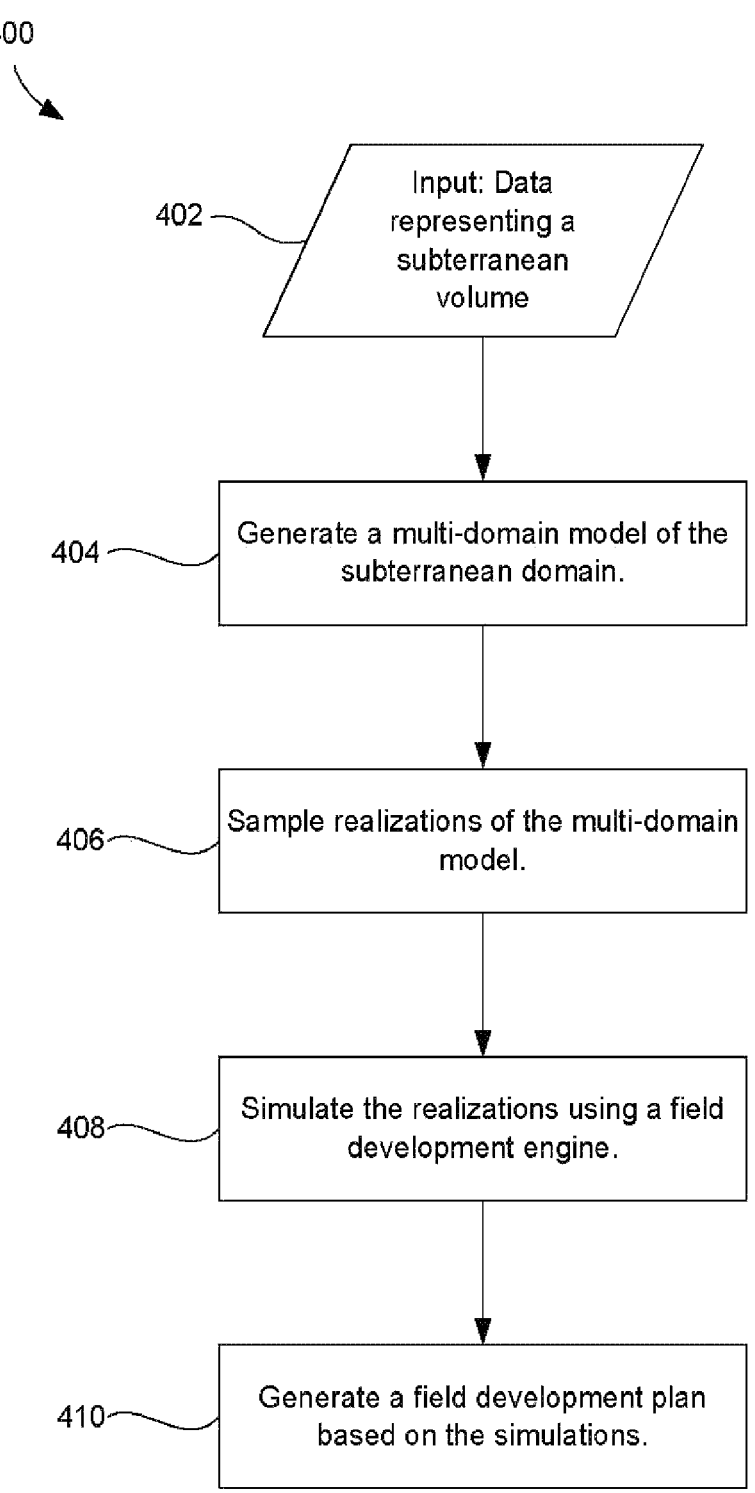
FIG. 4 illustrates a flowchart of a method for field development, e.g., generating a field development plan, according to an embodiment.

FIG. 4 illustrates a flowchart of a method 400 for field development, e.g., field development planning, according to an embodiment. The worksteps of the method 400 may be conducted in the order presented herein or in any other order. Moreover, individual worksteps may be partitioned into two or more worksteps, conducted at least partially in parallel, or combined, without departing from the scope of the present disclosure.

The method 400 may include, for example, receiving data (e.g., measurements) representing a subterranean volume, e.g., an oilfield, basin, reservoir, etc., as at 402. The data may be employed to generate a multi-domain model that digitally represents one or more features of the subterranean volume, as at 404. In addition, the multi-domain model may represent other aspects/domains of the subterranean volume, such as economic measures of hydrocarbon production from the subterranean volume, e.g., costs and/or price models associated therewith. Each of these models may carry uncertainty, and each may be run in a stochastic, probabilistic, or other type of model that accounts for uncertainty, e.g., by generating multiple outcomes or "realizations" of the model.

In some embodiments, such realizations can be generated by simulating one or more processes in the model.

The output of the model simulation may be one or more physical parameters or characteristics of the subterranean volume (and/or an economic aspect thereof). Values for the physical parameters may have a range of uncertainty, and a probability distribution within that range. Moreover, the values for the physical parameters may be binary or otherwise non-linear, e.g., one characteristic might be the presence or non-presence of a feature (e.g., a fault) at a particular location. A series of realizations may be generated in which the fault is in the location, and another series generated in which the fault is not present at that location, but potentially present at a different location. Each of these realizations may have a different probability, which may be at least partially dependent upon the probability of the fault being at the given location.

Another example of uncertainty that may be propagated through may be for flow simulation of the subsurface volume, which may be discretized into a grid. The discretization can be driven by the features or feature position, size, orientation, etc. and how these features interact with each other. Accordingly, in some embodiments, a "binary" feature could be a choice between competing grids that host the flow simulation (or geomechanics evaluation or combination). As a result, some realizations use grid A, some B, some C.

Accordingly, the multi-domain model of the subterranean domain may establish an "ensemble" of realizations, which may include complex elements representing the different permutations of realizations of the multiple underlying models that are used to generate the multi-domain model. Thus, rather than, for example, passing a few representative realizations (e.g., a worst case, best case, and medium case) from a geological model of hydrocarbon recovery to a commercial model, the present method 400 may permit the entire ensemble of the realizations to be built upon in successive models, e.g., successively adding to the complexity (e.g., dimensionality) of individual elements of the ensemble. Further, in at least some embodiments, processes in successive modeling domains may be able to select, e.g., based on statistical or other analyses, realizations from the predecessor models, rather than the predecessor domain providing the realizations to the successive domain.

The method 400 may then include sampling realizations of the multi-domain model, as at 406. In other words, elements of the ensemble may be accessed by a field development engine. This may again be a statistical sampling, in that it is not done at random, but using some analysis (in some embodiments, including machine learning) of the ensemble from which to select elements (i.e., realizations of the multi-domain model). Such sampling measures may be configured to identify areas of the uncertainty space where additional realizations should be selected, where outliers are present that may call for additional investigation (or may be ignored), where too many realizations have been selected for simulation, or where too few have been selected. Other examples for sampling include using k-means clustering and probability bands, among any number of other possibilities.

In some embodiments, the goal may be to select, for the complex simulation conducted by the field development engine, a few realizations that the field development engine considers to be suited for simulation, rather than relying on the individual domain model simulations to provide to the field development engine which realizations to use. Moreover, the same concept may be true on the model-to-model level, as noted above and as will be discussed in greater detail below, in which the subsequent models may be selected from realizations provided in the ensemble by predecessor models, rather than relying on the predecessor models to provide representative realizations (for subsequent models that the predecessor models may not be tuned for). The ensemble may thus provide linked elements that permit the uncertainty to be carried through to the different domains.

The method 400 may then include simulating the realizations using the field development engine, as at 408. The realizations may be simulated to determine a probability of success, viability, profitability, etc., of various combinations of inputs and outputs. The inputs might include, for example, different locations, equipment, drilling parameters, drilling activities, well trajectories, intervention processes, production parameters, etc. The inputs may also include economic models of price and cost of the resource extracted from the subterranean domain (e.g., hydrocarbon).

From this information one or more model realizations may be selected, and then equipment used and operations conducted, to the extent practical, based on the field development plan. In this respect, it will thus be appreciated that the generation of a field development plan, which more accurately accounts for uncertainty is a practical application for this method 400, which benefits the oil and gas exploration, drilling, and production technical fields. As known in the art, a field development plan provides an outline for developing, producing, and maintaining hydrocarbon resources in a particular field. Moreover, it forms an input for designing associated surface facilities. Accordingly, in at least some embodiments, the field development plan may be displayed to one or more users for such resource planning, facilities design, and process management.

Figure 5:
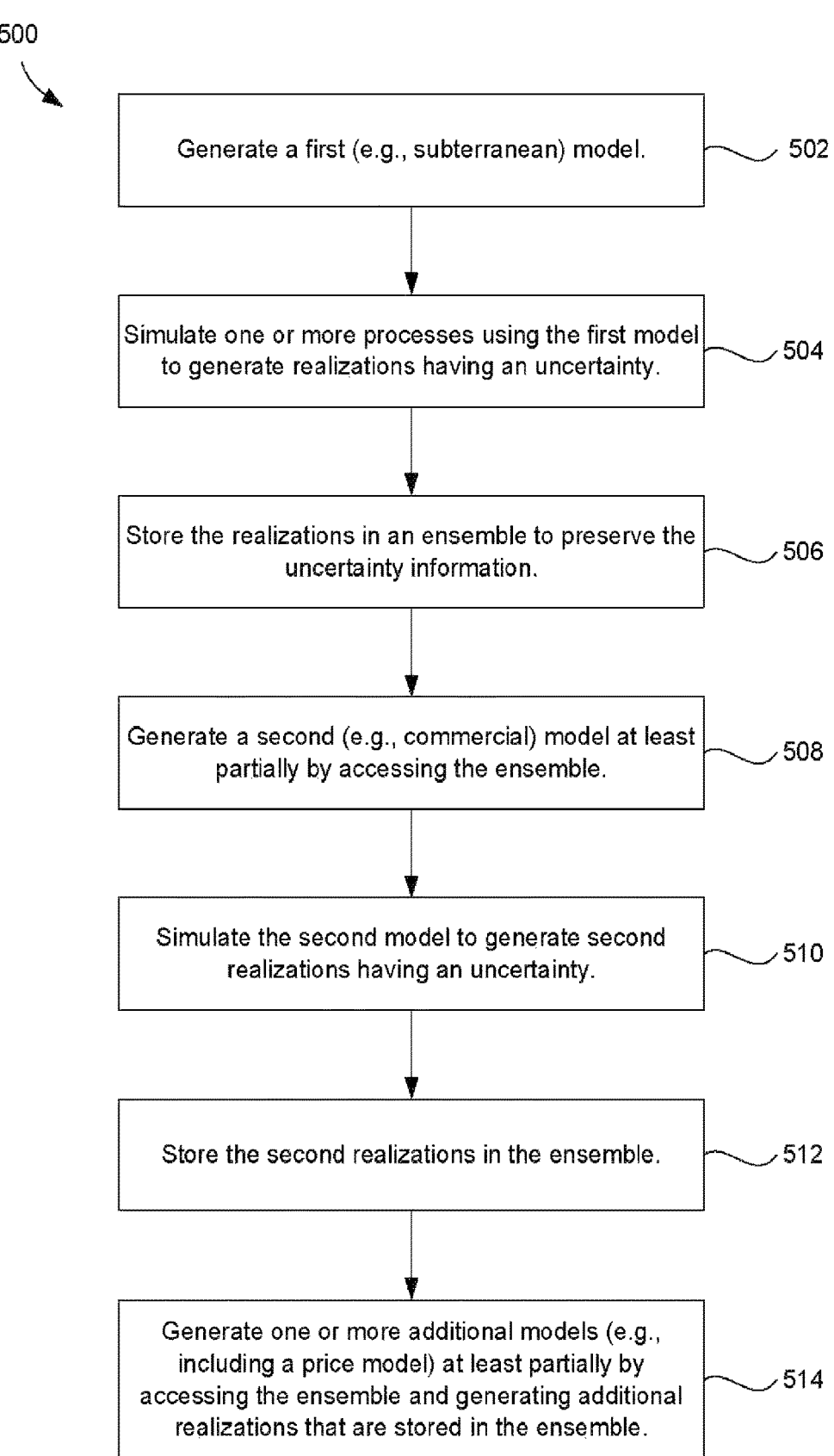
FIG. 5 illustrates a flowchart of a method for generating a multi-domain model, according to an embodiment.

FIG. 5 illustrates a flowchart of a method 500 for generating a multi-domain model, according to an embodiment. The method 500 of FIG. 5 may be part of the method 400 of FIG. 4, e.g., the box 404. Accordingly, the methods 400 and 500 should not be considered mutually exclusive. The worksteps of the method 500 may be conducted in the order presented herein or in any other order. Moreover, individual worksteps may be partitioned into two or more worksteps, conducted at least partially in parallel, or combined, without departing from the scope of the present disclosure.

The method 500 may include generating a first model, as at 502. For example, the first model may be or include one or more subsurface models (e.g., geological, facies, basin, rock, fluid flow, etc.). These models cover uncertainties associated with the underground volume, e.g., location of underground water, pore size, etc.) as well as well trajectory, location, etc. The subsurface models may be generated from data collected in the oilfield, such as core data, seismic data, well logs, etc.

The method 500 may also include simulating one or more processes using the first model, as at 504. This simulating may generate realizations, which may be different outputs/outcomes of the simulated model based on the uncertainty in the models, uncertainty in the inputs, and accounting for probabilistic occurrences, etc. Each of these realizations thus may include different outputs, each with a different confidence level. Moreover, as noted above, at least some of the outputs, e.g., parameters, may not be on a continuous spectrum or range of values, but may include binary determinations and/or other non-linearities.

The realizations may be stored in an ensemble, with, for example, each element of the ensemble representing a different realization, as at 506. In some embodiments, the first model simulated may initially populate the uncertainty space, and may represent the least complexity of the uncertainty space, as the dimensionality of the uncertainty space may be determined according to the output parameters of the first model. As subsequent models are built and realized, this complexity may increase, as the individual elements may each be used to generate multiple additional realizations, which may be added to the associated elements of the ensemble. This creation of an ensemble with elements that store and/or otherwise represent the realizations may preserve the uncertainty information from the model and its simulations and provide it for access to subsequent models/simulations.

The method 500 may then include generating a second model at least partially by accessing the ensemble, as at 506. As mentioned above, the second model may build upon the first model, using the first model (e.g., from the physical domain) for modelling cost associated with a process. The second model may be a commercial model, configured to analyze options available to commercialize the output from the subsurface model (e.g., sell gas on the local market or build liquefied natural gas plants to sell on the international market). Such second model may have its own uncertainty parameters, and may thus be simulated, as at 508, based on the output of the individual realizations of the first model and/or at least some of the raw inputs to the first model. Given that the second model may be a probabilistic model, the output of the second model may include a plurality of realizations, covering a range of outcomes with different levels of confidence/uncertainty. The second model may thus be able to select from the universe of first model realizations, rather than, for example, the first model (e.g., in the subterranean domain) selecting which model realizations would be most representative for the second model (e.g., in the commercial domain) to work from.

Each of the realizations of the second model may be added to the element of the ensemble representing the realization of the first model and stored therein, as at 510. As such, the complexity of the uncertainty space/ensemble increases, as individual elements, which previously represented a realization of the first model, may now represent a plurality of realizations of the second model based on the first model, each with potentially a different uncertainty, in addition to representing the realization of the first model.

A third model may similarly be generated and simulated by accessing the ensemble, as at 510. The third model may be, for example, an economic model, permitting analysis of market conditions for investment and commercialization of the estimated reserves (e.g., oil price, cost of operations, capital expenditure to drill wells and build facilities, etc.). The third model may be a probabilistic model, and thus accessing a single realization of the second model, within a single realization of the first model, may generate a plurality of third model realizations. These may be added to the ensemble, and subsequent models likewise built by repeating this sequence. Again, for each subsequent model, the entire ensemble (or potentially a curated part) of the model realizations may be available to use for inputs to the subsequent model. The subsequent models may thus statistically sample from the available realizations in the ensemble for simulation, or even simulate all of the realizations.

Figure 6:
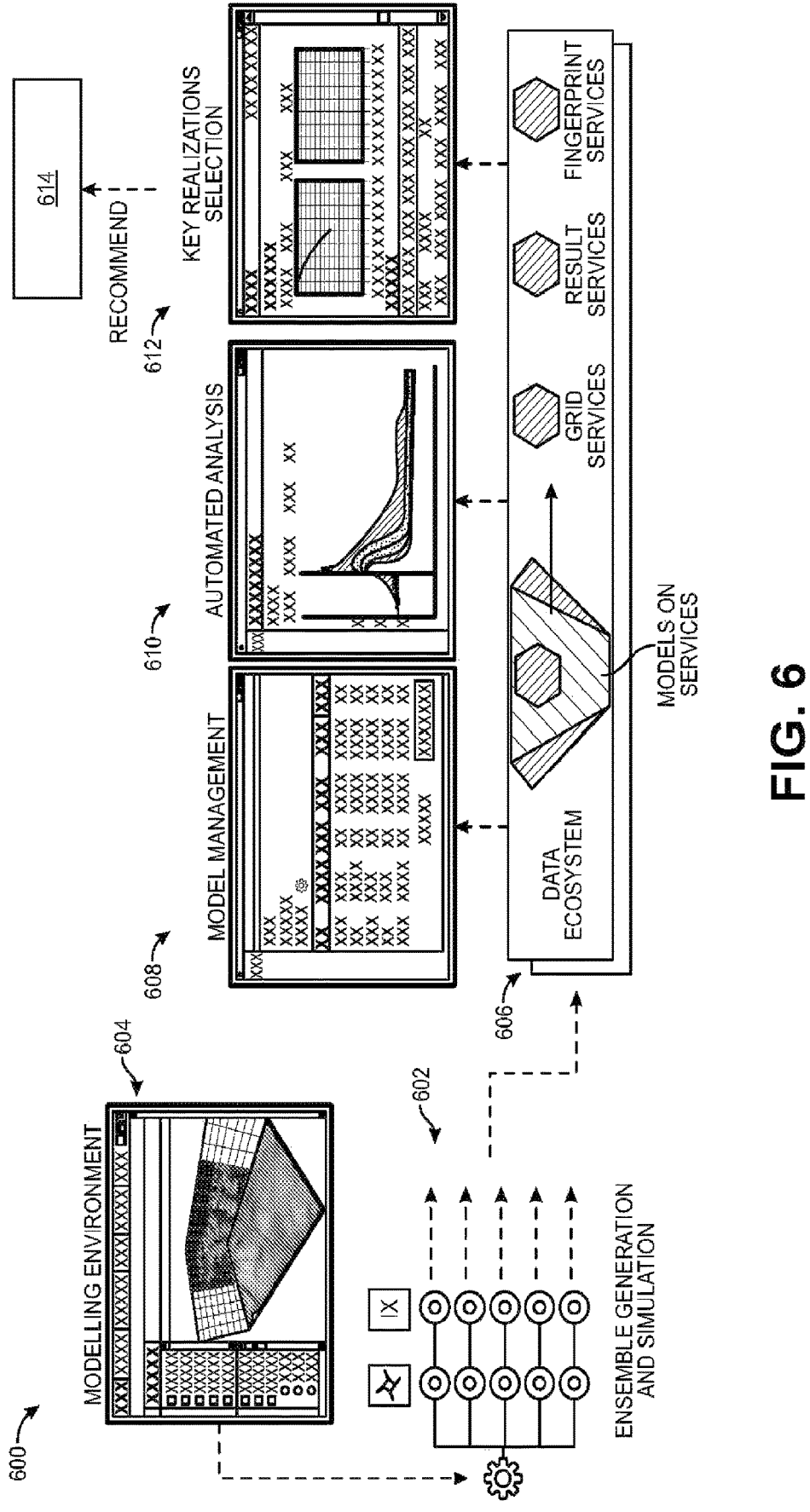
FIG. 6 illustrates an example of a system for field development planning, according to an embodiment.

FIG. 6 illustrates an example of a system 600 for field development planning, according to an embodiment. The system 600 may be configured to implement one or more embodiments of the method(s) 400, 500 discussed above, and thus at least some of the elements of the system 600 may be provided by software, hardware, or a combination thereof. The system 600 may include an ensemble generator

602. This may be the repository for the model realizations, which may be successively added and linked, as discussed above. These models may be generated by a modelling environment 604, which may receive inputs (e.g., raw measurements and/or outputs from predecessor models) and may simulate the models, generating the new realizations that are added to the ensemble generator 602.

The modelling environment 604 and the ensemble generator 602 may be part of a data ecosystem 606. The data ecosystem 606 may provide rapid access to the modelling data that the modelling environment 604 manipulates/simulates. Accordingly, large amounts of data may be quickly accessed by successive modelling environments by reference to a location within the data ecosystem, rather than, for example, having to pass the data itself, which can be too large for practical transmission times. The data ecosystem can also provide for model management 608, automated analysis 610, and key realization selection 612. The "key" realizations selection may refer to realizations being selected for either simulation in a field development plan engine 614 or for further consideration (e.g., display to a human user or team of human users) for implementation. One reason to display the "key" realization(s) may be to investigate one or more outlier realizations. Another reason might be to inspect/validate in detail one or more realizations are conforming as expected to physically realistic flow (e.g. flow around a fault).

Figure 7:
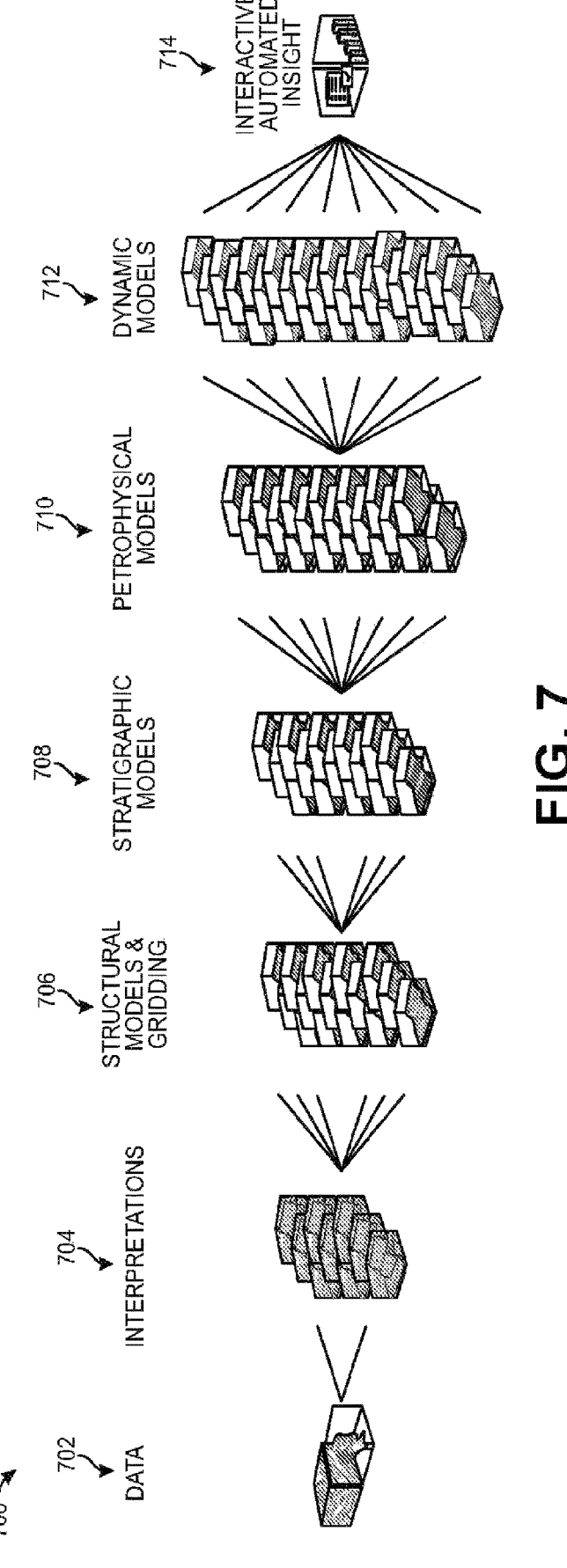
FIG. 7 illustrates a conceptual view of building an ensemble of realizations of a multi-dimensional model, according to an embodiment.

FIG. 7 illustrates a conceptual view of building an ensemble 700 of realizations of a multi-dimensional model, according to an embodiment. By way of example, this view shows the increasing complexity of the ensemble 700 as successive modelling domains are implemented. The ensemble 700 may begin as data, e.g., seismic cubes, as at 702. The data may be interpreted, as at 704, providing several different probabilistic interpretations according to the different models used to interpret the data. The interpretations may then be modeled and gridded at 706. The models may then be used to form stratigraphic models, as at 706. In turn, the stratigraphic models may be used to create petrophysical models 708, which in turn are used to generate dynamic models 710. At each stage of the modelling process, the ensemble 700 expands, as multiple realizations may be formed from a single realization of the prior stage. That is, there are more stratigraphic model possibilities, for example, than structural models. Based on the dynamic models 710, insights can be gleaned, as at 712, such as recommendations for field development plans or portions thereof.

Figure 8:
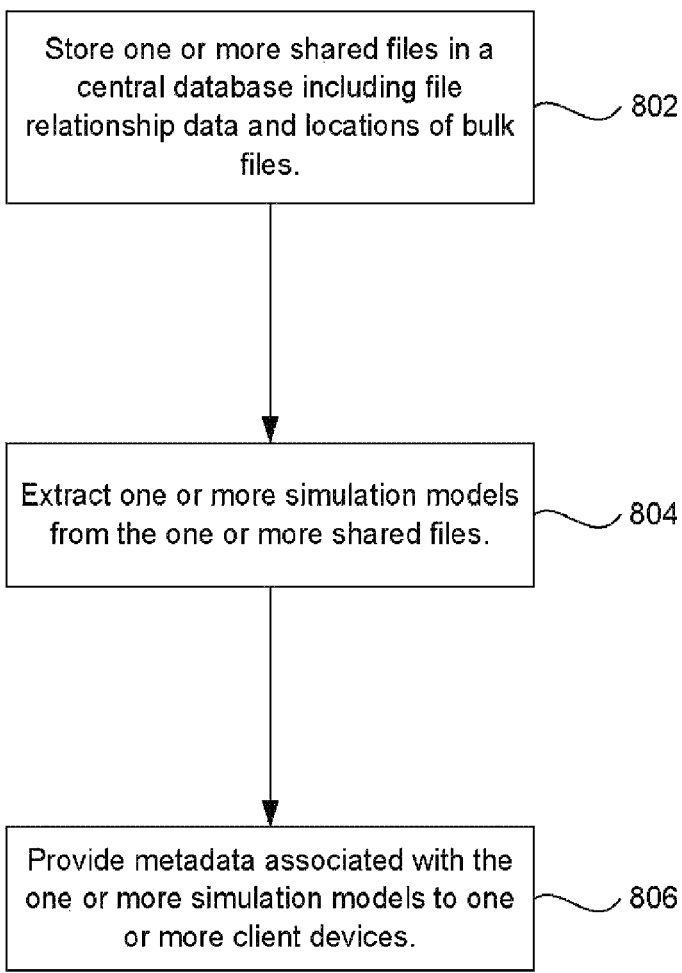
FIG. 8 illustrates a flowchart of a method, showing operations for a reservoir analysis process, according to an embodiment.

Referring now to FIG. 8, a flowchart of a method 800 is depicted, showing operations for a reservoir analysis process. The method 800 may occur prior to generating the multi-dimensional model at 404 of the method 400 of FIG. 4. The method 800 may include storing, as at 802, one or more shared files in a central database including file relationship data and locations of bulk files. The method 800 may also include extracting one or more simulation models from the one or more shared files, as at 804, and providing metadata associated with the one or more simulation models to one or more client devices, as at 806. For example, the method 800 may include evaluating the metadata associated with the one or more simulation models to identify one or more simulation models to use in the multi-domain model. The simulation models, or a selection thereof based, e.g., on the metadata, may then be provided to the method 400, e.g., for generating the multi-domain model at 404.

For example, simulators have a relatively complicated input model, which is particularly true of the reservoir simulators ECLIPSE® and INTERSECT®. These input models may be generated and modified by a number of workflows including manual edits and via PETREL®. Managing these models, including tracking updates and changes, as well as the associated results files is currently a manual process and usually accomplished via file naming conventions and comments in the models. These manual approaches are both hard to audit and error-prone.

Figure 9:
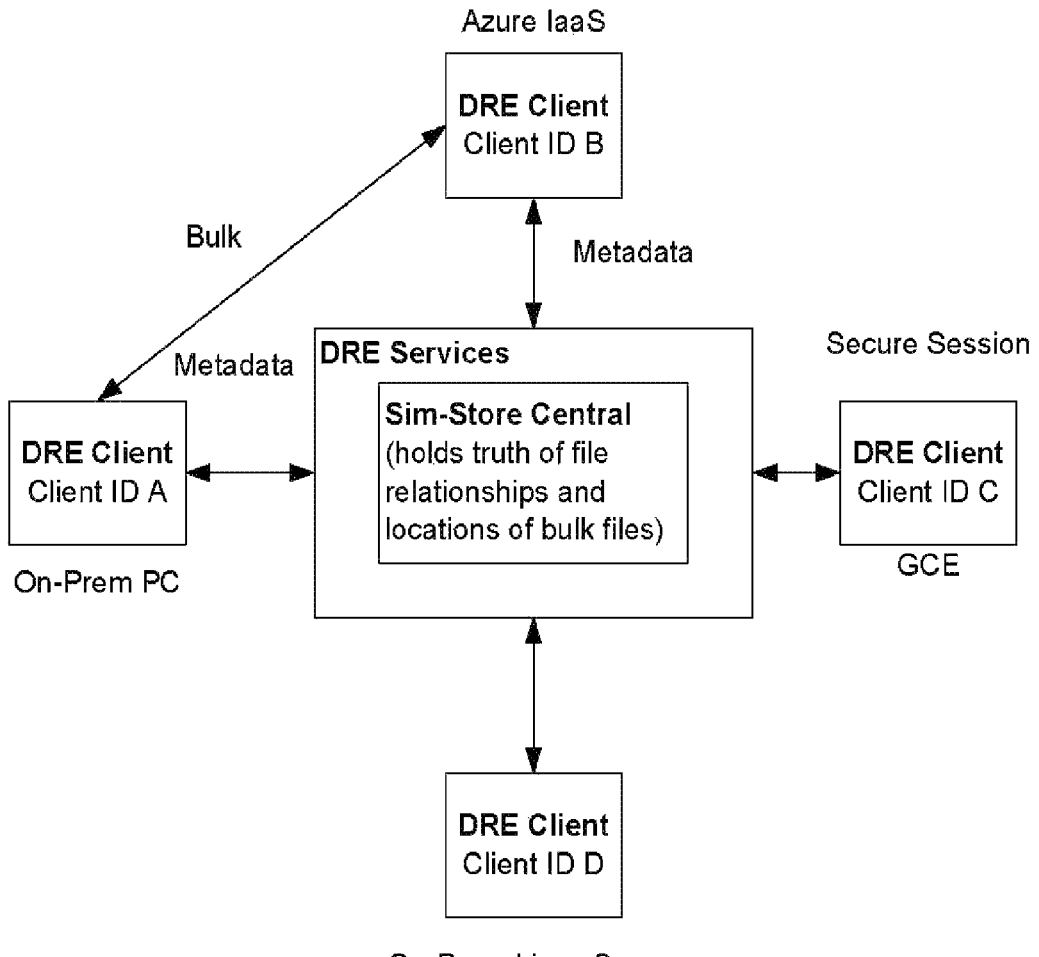
FIG. 9 illustrates an example conceptual topography for a system to implement such a reservoir analysis process, according to an embodiment.

FIG. 9 illustrates an example conceptual topography for a system to implement such a reservoir analysis process, according to an embodiment. The system may include a Sim-Store that may be designed to automate the versioning of simulator input and output files providing access to previous versions of the model, consistent auditing and tracking, and centralized storage for simulation models in collaborative workflows. Sim-Store has similarities to version control systems for source code, although Sim-Store has additional logic to understand the relationship between the various files that comprise a complete simulation model. Versioned storage for simulation models has been prototyped in the past, but not with this additional logic.

In some embodiments, reservoir analysis process may include the ability to extract simulation models from collections of files. The Sim-Store may provide a relationship between simulation input and output and the ability to identify if simulation results are stale. Embodiments may include the preservation of shared files and the ability to update multiple models through shared files. Embodiments may also provide a unique ID for simulations in the various environments (e.g., DELFI). Sim-Store may not reverse the original data into an internal domain model.

In some embodiments, Sim-Store functionality may be delivered at least in part via a web API. The Swagger API definition defines the endpoints for the service and may be viewed by cutting and pasting into the Swagger Editor. Traversal of the API may be achieved via following the links in the responses. URL mangling/construction may be avoided.

In some embodiments, reservoir analysis process may allow for the upload or update of one or more files. For example, if working with a new collection of files, the process may create a collection by POSTing on /v0/collections. The URL of the created collection may be returned in the response Location header. The process may GET the created collection using the location provided in last request, collectionId is in the "id" field of the payload. For a given collection, the process may create a staging area by POSTing on /v0/collections/{collectionId}/stagings. The URL of the created staging area may be returned in the response Location header. For each file to be created/changed POST to /v0/stagings/{stagingId}/changes/created or . . . /changed with payloads of the form

```
{
    "data": {
    "changeType": "created",
    "path": [
        "test.txt"
        ]
        }
}
```

In some embodiments, the process may get the Upload link in the response Location header. The process may GET the Upload using the location provided in the previous response. Using the content link in the Upload payload start the chunked upload. On getting responses from the blob storage complete the upload by POSTing to the complete link provided in the Upload payload. The process may GET the FileChange using the location provided in the previous response. For each file to be deleted POST on /v0/stagings/{stagingId}/changes/deleted. The POST on created, changed and deleted will fail if any of the files are wrongly categorized. When the files have been uploaded, POST on /v0/stagings/{stagingId}/complete to commit the set of files and create a new revision on the collection. Again, the POST may fail if any of the files have become wrongly categorized since the time they were uploaded.

In some embodiments, the process may get the files and results associated with a simulation. For a simulation URL GET the simulation information from /v0/simulation/{simulationId} and from the response retrieve the array of file links. These are the files required to run the simulation. From the simulation response retrieve the results link and GET from /v0/simulation/{simulationId}/results. From the response retrieve the array of file links. These are the results associated with the simulation.

In some embodiments, the process may get the latest version of a simulation. Using simulation URL GET the simulation information from /v0/simulation/{simulationId} and recover the array of version links. Sort and select the last link from the array of version links.

In some embodiments, the process may get the latest version of a file. Using a file URL GET the simulation information from /v0/files/{filesId} and recover the array of version links. The process may sort and select the last link from the array of version links.

In some embodiments, one or more extensions may be used to handle "bulk" ingestion scenarios where a large quantity of data that would take multiple days, or much longer, to ingest would limit the adoption of Sim-Store and DELFI Reservoir Engineering. Approaches include "Shallow" Sim-Store in which the data is distributed between both the clients and the central server and can be moved on demand.

Alternatively, "Deferred" Sim-Store allows the meta-data of the file to be initially uploaded to sim-store, including the MD5 checksum, but the file content uploaded at a later date and checked against the original MD5.

Figure 10B:
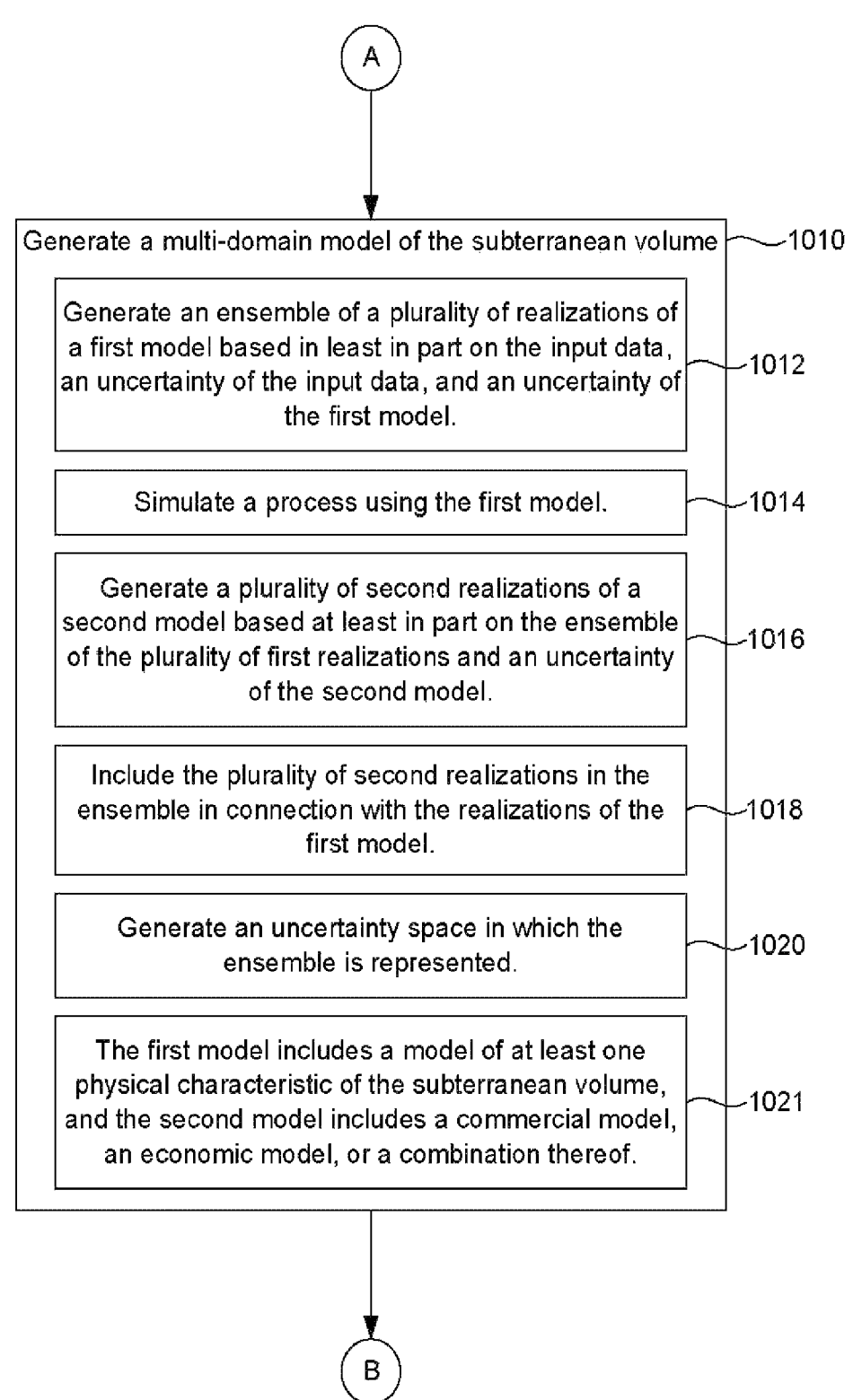

FIGS. 10A-C illustrate a flowchart of a method 1000, according to an embodiment. The method 1000 may include, before generating a multi-domain model, storing one or more shared files in a central database including file relationship data and locations of bulk files (e.g., 802, FIG. 8), as at 1002. The method 1000 may also include extracting one or more simulation models from the one or more shared files (e.g., block 804, FIG. 8), as at 1004. The method 1000 may further include evaluating metadata associated with the one or more simulation models to identify one or more simulation models to use in the multi-domain model (e.g., block 806, FIG. 8), as at 1006. The method 1000 includes receiving input data representing a subterranean volume (e.g., block 402, FIG. 4), as at 1008.

The method 1000 also includes generating a multi-domain model of the subterranean volume (e.g., block 404, FIG. 4), as at 1010. In an embodiment, generating the multi-domain model includes generating an ensemble of a plurality of realizations of a first model based at least in part on the input data, an uncertainty of the input data, and an uncertainty of the first model (e.g., blocks 502-506, FIG. 5), as at 1012. Generating the ensemble of the plurality of first realizations may include simulating a process using the first model (e.g., block 502, FIG. 5), as at 1014. Generating the multi-domain model may also include generating a plurality of second realizations of a second model based at least in part on the ensemble of the plurality of first realizations and an uncertainty of the second model (e.g., blocks 508-510, FIG. 5), as at 1016. Generating the multi-domain model may further include including the plurality of second realizations in the ensemble in connection with the realizations of the first model (e.g., block 512, FIG. 5), as at 1018.

Generating the multi-domain model may include generating an uncertainty space in which the ensemble is represented, the realizations of the multi-domain model being distributed in the uncertainty space (e.g., 504 and 512, FIG. 5), as at 1020. In some embodiments, the first model may include a model of at least one physical characteristic of the subterranean volume, and the second model comprises a commercial model, an economic model, or a combination thereof, as at 1021.

The method 1000 further includes statistically sampling one or more of the realizations of the multi-domain model based at least in part on an uncertainty associated therewith (e.g., block 406, FIG. 4), as at 1022. Statistically sampling the one or more of the realizations includes statistically sampling the one or more realizations from the uncertainty space based on a distribution of the realizations in the uncertainty space, as at 1024. Statistically sampling from the uncertainty space may include identifying one or more areas of the uncertainty space that are underrepresented in the sampling, overrepresented in the sampling, represent one or more outlier realizations, or a combination thereof, as at 1026. Statistically sampling may include using machine learning, k-means clustering, probability bands, or a combination thereof to select the one or more realizations from among other, non-selected realizations, as at 1028.

The method 1000 includes simulating the sampled one or more of the realizations using a field development planning engine (e.g., block 408, FIG. 4), as at 1030. The method 1000 includes generating a field development plan based at least in part on the simulated one or more of the realizations (e.g., block 410, FIG. 4), as at 1032. In an embodiment, the method 1000 includes visualizing the field development plan, at least a portion of the multi-domain model, or both, to support one or more field development processes, as at 1034.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 11:
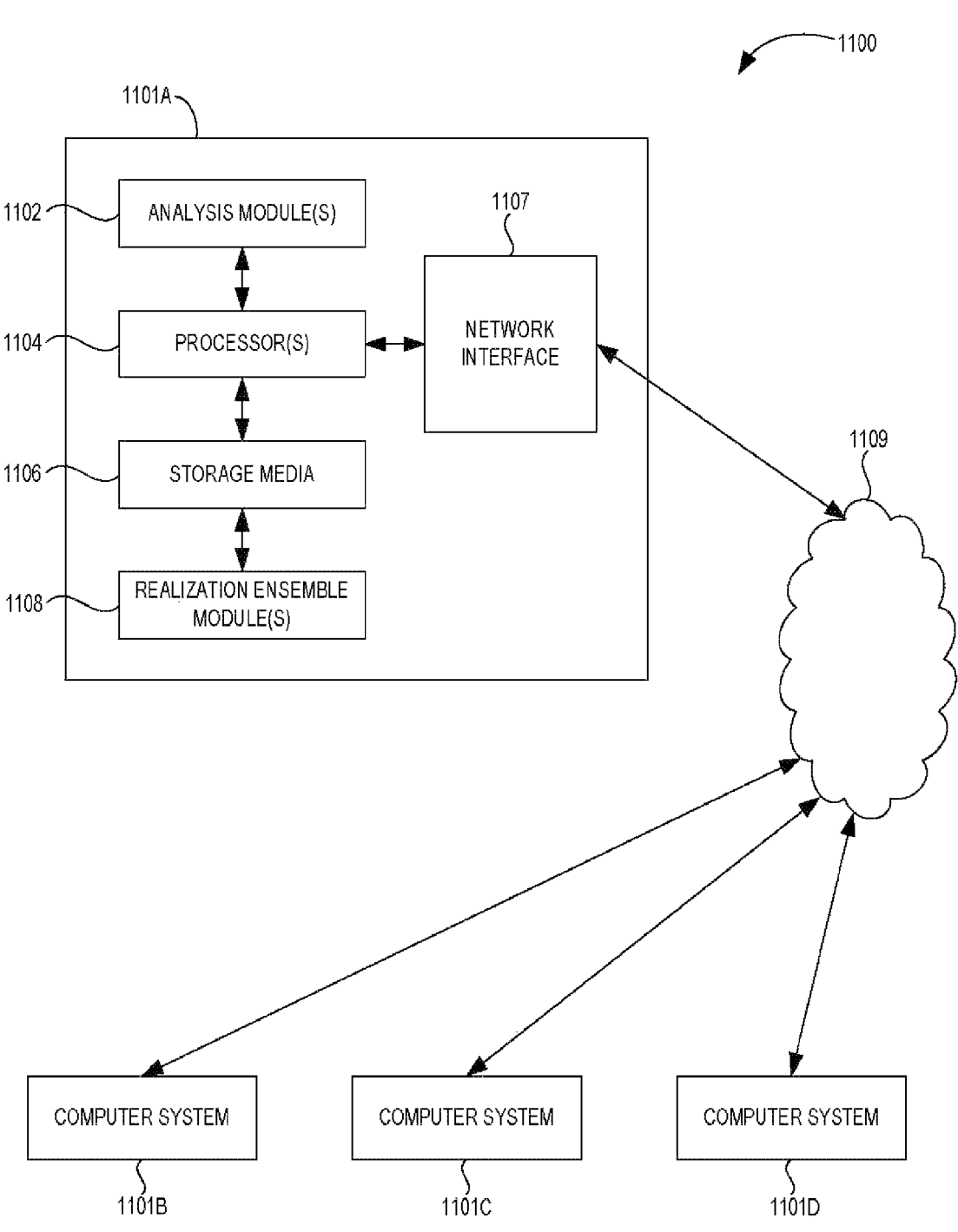
FIG. 11 illustrates a schematic view of a computing system, according to an embodiment.

In some embodiments, any of the methods of the present disclosure may be executed by a computing system. FIG. 11 illustrates an example of such a computing system 1100, in accordance with some embodiments. The computing system 1100 may include a computer or computer system 1101A, which may be an individual computer system 1101A or an arrangement of distributed computer systems. The computer system 1101A includes one or more analysis module(s) 1102 configured to perform various tasks according to some embodiments, such as one or more methods disclosed herein. To perform these various tasks, the analysis module 1102 executes independently, or in coordination with, one or more processors 1104, which is (or are) connected to one or more storage media 1106. The processor(s) 1104 is (or are) also connected to a network interface 1107 to allow the computer system 1101A to communicate over a data network 1109 with one or more additional computer systems and/or computing systems, such as 1101B, 1101C, and/or 1101D (note that computer systems 1101B, 1101C and/or 1101D may or may not share the same architecture as computer system 1101A, and may be located in different physical locations, e.g., computer systems 1101A and 1101B may be located in a processing facility, while in communication with one or more computer systems such as 1101C and/or 1101D that are located in one or more data centers, and/or located in varying countries on different continents).

A processor can include a microprocessor, microcontroller, processor module or subsystem, programmable integrated circuit, programmable gate array, or another control or computing device.

The storage media 1106 can be implemented as one or more computer-readable or machine-readable storage media. Note that while in the example embodiment of FIG. 11 storage media 1106 is depicted as within computer system 1101A, in some embodiments, storage media 1106 may be distributed within and/or across multiple internal and/or external enclosures of computing system 1101A and/or additional computing systems. Storage media 1106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY ° disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1100 contains one or more realization ensemble module(s) 1108. In the example of computing system 1100, computer system 1101A includes the realization ensemble module 1108. In some embodiments, a single realization ensemble module may be used to perform some or all aspects of one or more embodiments of the methods. In alternate embodiments, a plurality of realization ensemble modules may be used to perform some or all aspects of methods.

It should be appreciated that computing system 1100 is only one example of a computing system, and that computing system 1100 may have more or fewer components than shown, may combine additional components not depicted in the example embodiment of FIG. 11, and/or computing system 1100 may have a different configuration or arrangement of the components depicted in FIG. 11. The various components shown in FIG. 11 may be implemented in hardware, software, or a combination of both hardware and software, including one or more signal processing and/or application specific integrated circuits.

Further, the steps in the processing methods described herein may be implemented by running one or more functional modules in information processing apparatus such as general-purpose processors or application-specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1100, FIG. 11), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:

performing an oilfield operation using a set of sensors to collect input data from a subterranean volume;

wherein the input data specifies a weight on bit parameter associated with the operation, a torque on bit parameter associated with the operation, a pressure parameter associated with the operation, a flow rate parameter associated with the operation, a rotary speed parameter associated with the operation, a well log, a porosity parameter associated with the operation, a fluid composition parameter associated with the operation, and a permeability parameter associated with the operation, wherein the set of sensors comprises a geophone and a gauge, wherein the subterranean volume comprises a shale layer, a carbonate layer, and a sand layer, and wherein the operation is a drilling operation, a wireline operation, or a seismic survey operation;

receiving the input data representing the subterranean volume;

generating a multi-domain model of the subterranean volume using the input data;

statistically sampling one or more realizations of the multi-domain model based at least in part on an uncertainty associated therewith to generate sampled realizations, wherein statistically sampling comprises using machine learning, k-means clustering, probability bands, or a combination thereof to select the one or more realizations from among other, non-selected realizations;

simulating the sampled realizations using a field development planning engine to generate simulated realizations for determining viability and profitability of a location and a well trajectory in the subterranean volume;

generating a field development plan based at least in part on the simulated realizations;

displaying the field development plan and the multi-domain model to a user; and using the field development plan to manage a hydrocarbon resource in the subterranean volume and to inspect an outlier realization.

2. The method of claim 1, wherein generating the multi-domain model comprises:

generating an ensemble of a plurality of realizations of a first model based at least in part on the input data, an uncertainty of the input data, and an uncertainty of the first model;

generating a plurality of second realizations of a second model based at least in part on the ensemble of the plurality of realizations and an uncertainty of the second model; and including the plurality of second realizations in the ensemble in connection with the realizations of the first model.

3. The method of claim 2, wherein generating the ensemble of the plurality of realizations comprises simulating a process using the first model.

4. The method of claim 2, wherein generating the multi-domain model comprises generating an uncertainty space in which the ensemble is represented, wherein the realizations of the multi-domain model are distributed in the uncertainty space, and wherein statistically sampling the one or more realizations comprises statistically sampling the one or more realizations from the uncertainty space based on a distribution of the realizations in the uncertainty space.

5. The method of claim 2, wherein the first model comprises a model of at least one physical characteristic of the subterranean volume, and wherein the second model comprises a commercial model, an economic model, or a combination thereof.

6. The method of claim 1, further comprising:

before generating the multi-domain model:

storing one or more shared files in a central database including file relationship data and locations of bulk files;

extracting one or more simulation models from the one or more shared files; and evaluating metadata associated with the one or more simulation models to identify one or more simulation models to use in the multi-domain model.

7. A non-transitory, computer-readable medium storing instructions that, when executed by at least one processor of a computing system, cause the computing system to perform operations, the operations comprising:

performing an oilfield operation using a set of sensors to collect input data from a subterranean volume;

wherein the input data specifies a weight on bit parameter associated with the operation, a torque on bit parameter associated with the operation, a pressure parameter associated with the operation, a flow rate parameter associated with the operation, a rotary speed parameter associated with the operation, a well log, a porosity parameter associated with the operation, a fluid composition parameter associated with the operation, and a permeability parameter associated with the operation, wherein the set of sensors comprises a geophone and a gauge, wherein the subterranean volume comprises a shale layer, a carbonate layer, and a sand layer, and wherein the operation is a drilling operation, a wireline operation, or a seismic survey operation;

receiving the input data representing the subterranean volume;

generating a multi-domain model of the subterranean volume using the input data;

statistically sampling one or more realizations of the multi-domain model based at least in part on an uncertainty associated therewith to generate sampled realizations, wherein statistically sampling comprises using machine learning, k-means clustering, probability bands, or a combination thereof to select the one or more realizations from among other, non-selected realizations;

simulating the sampled realizations using a field development planning engine to generate simulated realizations for determining viability and profitability of a location and a well trajectory in the subterranean volume;

generating a field development plan based at least in part on the simulated realizations; and displaying the field development plan and the multi-domain model to a user, wherein the field development plan is used to manage a hydrocarbon resource in the subterranean volume and to inspect an outlier realization.

8. The medium of claim 7, wherein generating the multi-domain model comprises:

generating an ensemble of a plurality of realizations of a first model based at least in part on the input data, an uncertainty of the input data, and an uncertainty of the first model;

generating a plurality of second realizations of a second model based at least in part on the ensemble of the plurality of first realizations and an uncertainty of the second model; and including the plurality of second realizations in the ensemble in connection with the realizations of the first model.

9. The medium of claim 8, wherein generating the ensemble of the plurality of first realizations comprises simulating a process using the first model.

10. The medium of claim 8, wherein generating the multi-domain model comprises generating an uncertainty space in which the ensemble is represented, wherein the realizations of the multi-domain model are distributed in the uncertainty space, and wherein statistically sampling the one or more realizations comprises statistically sampling the one or more realizations from the uncertainty space based on a distribution of the realizations in the uncertainty space.

11. The medium of claim 8, wherein the first model comprises a model of at least one physical characteristic of the subterranean volume, and wherein the second model comprises a commercial model, an economic model, or a combination thereof.

12. The medium of claim 7, wherein the operations further comprise:

before generating the multi-domain model:

storing one or more shared files in a central database including file relationship data and locations of bulk files;

extracting one or more simulation models from the one or more shared files; and evaluating metadata associated with the one or more simulation models to identify one or more simulation models to use in the multi-domain model.

13. A computing system, comprising:

one or more processors; and a memory system including one or more non-transitory computer-readable media storing instructions that, when executed by at least one of the one or more processors, cause the computing system to perform operations, the operations comprising:

performing an oilfield operation using a set of sensors to collect input data from a subterranean volume;

wherein the input data specifies a weight on bit parameter associated with the operation, a torque on bit parameter associated with the operation, a pressure parameter associated with the operation, a flow rate parameter associated with the operation, a rotary speed parameter associated with the operation, a well log, a porosity parameter associated with the operation, a fluid composition parameter associated with the operation, and a permeability parameter associated with the operation, wherein the set of sensors comprises a geophone and a gauge, wherein the subterranean volume comprises a shale layer, a carbonate layer, and a sand layer, and wherein the operation is a drilling operation, a wireline operation, or a seismic survey operation;

receiving the input data representing the subterranean volume;

generating a multi-domain model of the subterranean volume using the input data, wherein generating the multi-domain model comprises:

generating an ensemble of a plurality of realizations of a first model based at least in part on the input data, an uncertainty of the input data, and an uncertainty of the first model;

generating a plurality of second realizations of a second model based at least in part on the ensemble of the plurality of realizations and an uncertainty of the second model; and including the plurality of second realizations in the ensemble in connection with the realizations of the first model, wherein the first model comprises a model of at least one physical characteristic of the subterranean volume, and wherein the second model comprises a commercial model, an economic model, or a combination thereof;

statistically sampling one or more realizations of the multi-domain model based at least in part on an uncertainty associated therewith to generate sampled realizations, wherein statistically sampling comprises using machine learning, k-means clustering, probability bands, or a combination thereof to select the one or more realizations from among other, non-selected realizations;

simulating the sampled one or more of the realizations using a field development planning engine to generate simulated realizations for determining viability and profitability of a location and a well trajectory in the subterranean volume; and generating a field development plan based at least in part on the simulated realizations; and displaying the field development plan and the multi-domain model to a user, wherein the field development plan is used to manage a hydrocarbon resource in the subterranean volume and to inspect an outlier realization.

14. The computing system of claim 13, wherein:

generating the multi-domain model comprises generating an uncertainty space in which the ensemble is represented, wherein the realizations of the multi-domain model are distributed in the uncertainty space, and wherein statistically sampling the one or more realizations comprises statistically sampling the one or more realizations from the uncertainty space based on a distribution of the realizations in the uncertainty space, and statistically sampling from the uncertainty space comprises identifying one or more areas of the uncertainty space that are underrepresented in the sampling, overrepresented in the sampling, represent one or more outlier realizations, or a combination thereof.

15. The computing system of claim 14, wherein generating the ensemble of the plurality of realizations comprises simulating a process using the first model.

16. The computing system of claim 13, wherein the operations further comprise:

before generating the multi-domain model:

storing one or more shared files in a central database including file relationship data and locations of bulk files;

extracting one or more simulation models from the one or more shared files; and evaluating metadata associated with the one or more simulation models to identify one or more simulation models to use in the multi-domain model.

*    *    *    *    *